3,013,582
PIVOTAL CONTROL VALVE ARRANGEMENT
Josef Eibl, Munich, Germany, assignor to Bayerische
Motoren Werke A.G., Munich, Germany
Filed Nov. 17, 1958, Ser. No. 774,337
Claims priority, application Germany Nov. 21, 1957
9 Claims. (Cl. 137—625.44)

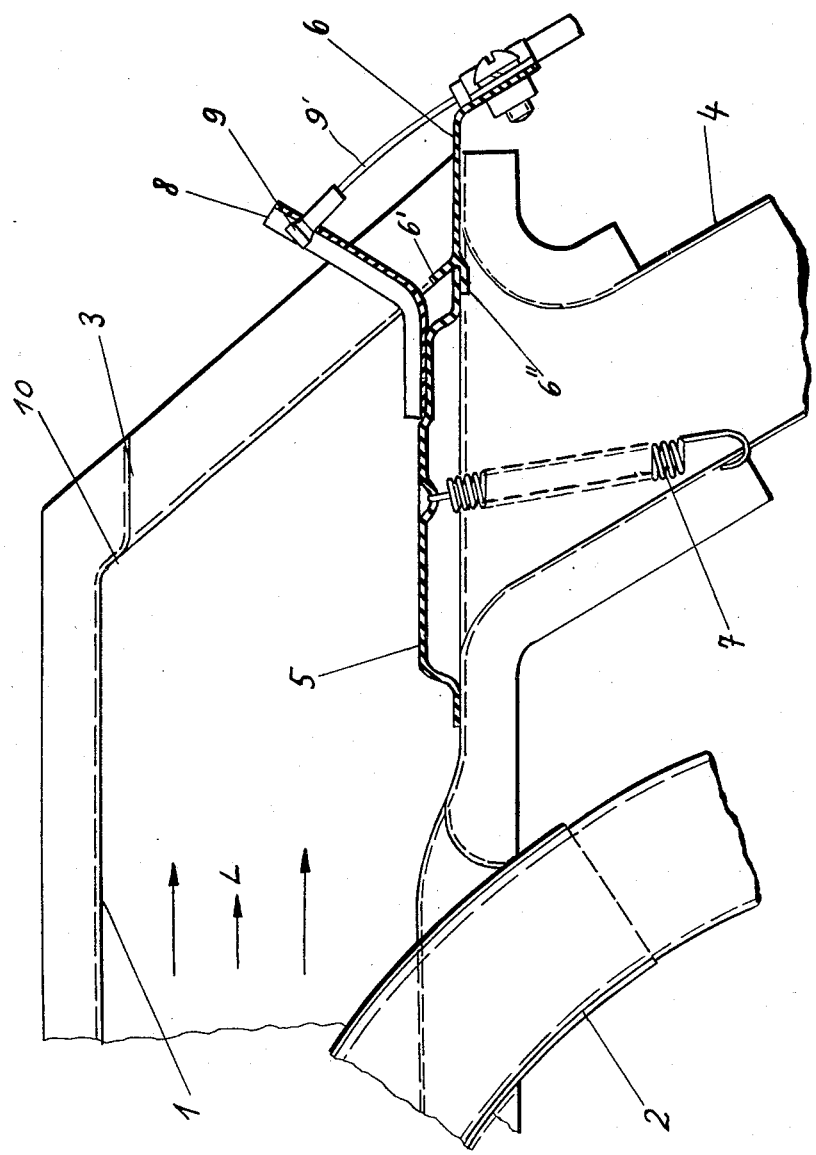

The present invention relates to a pivotally arranged control flap or valve member, especially for purposes of controlling or closing-off a guide line or conduit or for purposes of controlling the direction of flow at a bifurcation of lines or conduits conducting flow media, the pivotal axis of which is so arranged as to be self-adjusting with respect to the sealing seats or surfaces thereof.

It is a significant feature in accordance with the present invention that a rim portion or section of the control valve member serves directly as the pivot axis thereof and that this rim portion is supported in a freely movable manner in a fork-shaped corner-like dihedral part of the control valve housing.

The fork-shaped support for the control valve is thereby so constructed, according to a further feature in accordance with the present invention, that the angle of opening of the fork-shaped support, i.e., the angle subtended by the leg portions thereof, essentially corresponds to the pivot angle of the control valve member and that the fork-shaped support simultaneously forms a part of the sealing seating surfaces for the control valve member when the latter is in one of the two end positions thereof.

According to one preferred embodiment in accordance with the present invention, a spring is provided, which, on the one hand, is operatively connected with the control valve member, and, on the other, is operatively secured to the valve guide means, whereby the spring is effective, over the entire pivoting range of the control valve member, at least with a force component in the direction toward the pivot axis of the control valve member. The arrangement in accordance with the present invention may thereby be so made that the spring constructed as a draw spring acts with a force component thereof in alternate effectiveness with an actuating member in the direction toward one of the end positions of the control valve member.

As compared to the known pivotal supports of valve members or flaps of different types and used for different purposes by means of positive hinge connections, the hinge-less support in accordance with the present invention offers significant advantages with respect to the constructional simplicity thereof and therewith with respect to a relatively inexpensive manufacture thereof.

Furthermore, the support and arrangement in accordance with the present invention is trouble-free in operation since it is relatively insensitive, for example, to relatively large heat variations or fluctuations, i.e., against warping of the hinge axis which, as is well known, has very disadvantageous effects with hinged supports.

Furthermore, an extremely simple assembly and mounting thereof is made possible in accordance with the present invention because the control valve member only has to be hung or suspended into the support thereof and the pivotal axis thereof adjusts itself automatically. In particular, the arrangement in accordance with the present invention assures at all times, i.e., in each position between the two end positions of the control valve member, a satisfactory, unobjectionable seating of the control valve member and a continued maintenance or retention having, above all, freedom from play of the position of the rotary axis thereof since the spring acts on the inside of the control valve member and the imaginary rotary axis thereof, in contradistinction to a support with a hinge formed as an independent machined part, coincides exactly with the outermost seating rim of the valve member.

Accordingly, it is an object of the present invention to provide a control valve member adapted to be shifted between two end positions which is simple in construction, inexpensive in manufacture, and easy in the installation thereof.

It is another object of the present invention to provide a hinge-less support or mounting of a control valve member on a relatively stationary part which, nonetheless, assures unobjectionable, trouble-free operation thereof.

Another object of the present invention is the provision of a hinge-less support for a control valve which, nonetheless, is operative as if hinged about a pivot axis and which is also relatively insensitive to heat fluctuations thereof during operation thereof.

These and other objects, features and advantages of the present invention will become more obvious from the following description when taken in connection with the accompanying drawing, which shows in the single FIGURE thereof a partial cross-sectional view of a control valve arrangement in accordance with the present invention.

Referring now to the drawing, which shows a partial cross-sectional view through an exhaust-gas heating installation for motor vehicles, reference numeral 1 designates the collective enclosure or heating chamber to which fresh air, schematically indicated in the drawing by arrows L, which may be, for instance, the already heated cooling air forced through the conduit 1 by means of a suitable blower (not shown), is further heated within the enclosure or chamber 1 by radiant heat and/or convection derived from the exhaust gas pipe 2 extending through the enclosure or chamber 1. A pipe nipple or connection 3 leads directly into the outside air or atmosphere so as to avoid also during relatively warmer periods of the seasons, when the heating system for the vehicle interior is turned off, an overheating of the installation. Furthermore, another line of conduit 4 for the further conduction of the heated air L is operatively connected with the enclosure or chamber 1 which line 4 leads into the vehicle interior space in any suitable manner (not shown). The support for the control valve 5 is formed by a sheet-metal member 6 suitably secured at the rear part thereof to a relatively fixed portion of the vehicle and provided in the forward part thereof with a fork-shaped portion, the two leg portions 6' and 6" of which subtend therebetween an angle constituting the pivot angle, whereby the upper leg portion 6' is obtained by bending up the two outer parts with respect to the rectilinear center leg portion 6" of the sheet metal member 6.

The fork-shaped supports 6' and 6" could also be constructed in any other suitable and appropriate manner, for example, by the angular configuration of two converging and mutually abutting separate machined parts, of a cast part cast as a housing forming the supply line for the heated fresh air and the discharge thereof into the vehicle interior space, and of a sheet metal cover in which an aperture is provided for the discharge of the heated air into the atmosphere and which simultaneously represents one of the two seats for the shiftable control valve member.

One end of the draw spring 7 is operatively connected with and acts within the circumference of the shifting valve 5, preferably concentrically with respect thereto, whereas the second end of the spring is secured to line 4. The arrangement of the spring 7 is thereby so made that a force component is effective as closing force in the circumferential direction, whereas the other force component is directed against the support 6', 6" of the valve member 5 so that the spring 7 is effective to retain the control valve member 5 within the support 6', 6" thereof.

An angular sheet metal member 8 is suitably secured to the control valve 5 which sheet metal member 8 serves for purposes of engagement or suspension therein of the end 9 of a cable cord, rope or similar draw device 9' constituting an actuating member for the remote actuation of the control valve member 5. If the control cable 9' is drawn, then the opening 3 leading into atmosphere is closed and the valve 5 engages or rests against the seating surface designated by reference numeral 10.

While I have shown and described one embodiment in accordance with the present invention, it is understood that the same is not limited thereto but is susceptible of many changes and modifications within the scope and spirit of the present invention. For example, the arrangement and support of the control valve member may be made of different construction and may find use in the most varied applications. Furthermore, the present invention also includes different conditions of the aggregate of the medium in any kind of a line system. Thus, it is obvious that the present invention is susceptible of many changes and modifications within the scope and spirit of the present invention, and I, therefore, do not wish to be limited to the particular embodiment shown and described herein only for purposes of illustration but intend to cover all such changes and modifications as are encompassed by the scope of the appended claims.

I claim:

1. A pivotally arranged control valve arrangement, comprising relatively stationary valve housing means having sealing seating surface means, control valve means arranged in said housing means, and means for supporting said control valve means in said relatively stationary housing means so as to provide a self adjustment of the pivot axis thereof with respect to said seating surface means including fork-shaped support means forming part of said sealing seating surface means and having loosely supported therein one rim portion of said control valve means in a freely movable manner, whereby the end surface of said rim portion of the control valve means serves effectively and directly as pivot axis thereof and in the end positions of said control valve member sealingly engages said sealing and seating surface means.

2. A pivotally arranged control valve arrangement according to claim 1, further comprising spring means normally urging said control valve member into one end position thereof and at the same time extending a force component in the direction toward the pivot axis thereby to assure positive seating of said rim portion in said fork-shaped support means.

3. A pivotally arranged control valve arangement according to claim 2, wherein said spring means is a draw spring, and further comprising actuating means alternately effective with said draw spring to selectively move said control valve member in one of the end positions thereof.

4. A pivotally arranged control valve arrangement according to claim 3, wherein said actuating means includes a Bowden cable operatively connected with said control valve member and effective in the direction to move said control valve member in opposition to the spring force exerted by said draw spring.

5. A pivotally-arranged control valve, especially for controlling the direction of flow of a fluid medium in a housing having one inlet and two outlets, comprising a control valve member, a sealing and seating surface means for said valve member including two parts forming together a fork-shaped member, and means for pivotally supporting said control valve member in said housing, said last-mentioned means providing a self-adjustment of the pivot axis of the valve member with respect to said sealing and seating surface and including said fork-shaped member and a spring means secured to said control valve member, said spring means normally urging said control valve member toward the pivot axis thereof to assure positive seating of said rim portion in said fork-shaped support means, said fork-shaped member having one rim portion of said control valve member freely supported therein in a movable manner whereby the end surface of said one rim portion serves directly as the pivot axis for the valve member and in the end position of said control valve member sealingly engages said sealing and seating surface means.

6. A pivotally-arranged control valve, especially for controlling the direction of flow of a fluid medium in a housing having one inlet and two outlets, comprising a control valve member, a sealing and seating surface means including two parts forming together a fork-shaped member, and means for pivotally supporting said control valve member in said housing including said fork-shaped member and a spring means secured to said control valve member, said last-mentioned means providing a self-adjustment of the pivot axis of said control valve member with respect to said sealing and seating surface, said fork-shaped member having one rim portion of said control valve member supported therein in a freely movable manner whereby the end surface of said one rim portion serves directly as the pivot axis for the valve member and in the end position of said control valve member engages said sealing and seating surface means, and said spring means normally urging said control valve member into one end position thereof and at the same time always exerting a force component in the direction toward the pivot axis thereof to assure positive seating and sealing of said rim portion in said fork-shaped member.

7. A pivotally-arranged control valve, especially for controlling the direction of flow of a fluid medium in a housing having one inlet and two outlets, comprising said housing, a control valve member adapted to control said direction of flow between said inlet and said outlets, a sealing and seating surface means including one part forming a wall of said housing and another part extending into said housing between said two outlets, said two parts forming together a fork-shaped support member, and means for pivotally supporting said control valve member in said housing including said fork-shaped member and a spring means secured to said control valve member, said last-mentioned means providing a self-adjustment of the pivot axis of said control valve member with respect to said sealing and seating surface means, the two parts forming said fork-shaped member subtending an angle essentially equal to the pivot axis of said control valve member, said fork-shaped member having one rim portion of said control valve member loosely supported therein in a freely movable manner whereby the end surface of said one rim portion serves directly as the pivot axis of the valve member and in each end position of said control valve member engages respectively one of said two parts of the fork-shaped member, said spring means normally urging said control valve member into one end position thereof and at the same-time always exerting a force component in the direction toward the pivot axis thereof to assure positive sealing and seating of said rim portion in said fork-shaped support member.

8. A pivotally arranged control valve arrangement according to claim 7, wherein said spring means is a draw spring, and further comprising actuating means alternately effective with said draw spring to selectively move said control valve member in one of the end positions thereof.

9. A pivotally arranged control valve arrangement according to claim 8, wherein said actuating means includes a Bowden cable operatively connected with said control valve member and effective in the direction to move said control valve member in opposition to the spring force exerted by said draw spring.

References Cited in the file of this patent

UNITED STATES PATENTS

| | | |
|---|---|---|
| 137,268 | Wetmore | Mar. 25, 1873 |
| 1,496,915 | Weir | June 10, 1924 |
| 1,529,900 | Mayer | Mar. 17, 1925 |
| 1,915,994 | Harnett | June 27, 1933 |
| 2,636,518 | Strebel | Apr. 28, 1953 |